United States Patent
Donahue

(10) Patent No.: US 7,657,831 B2
(45) Date of Patent: Feb. 2, 2010

(54) CREATING AND CUSTOMIZING A WORKFLOW PROCESS FROM A DOCUMENT

(75) Inventor: John J Donahue, Melrose, MA (US)

(73) Assignee: J.J. Donahue & Company, Boston, MA (US)

( * ) Notice: Subject to any disclaimer, the term of this patent is extended or adjusted under 35 U.S.C. 154(b) by 0 days.

(21) Appl. No.: 10/630,905

(22) Filed: Jul. 31, 2003

(65) Prior Publication Data

US 2005/0027733 A1    Feb. 3, 2005

(51) Int. Cl.
 *G06F 17/00* (2006.01)
(52) U.S. Cl. .................................. 715/234; 707/102
(58) Field of Classification Search ................ 715/513, 715/234; 705/9; 707/102
 See application file for complete search history.

(56) References Cited

U.S. PATENT DOCUMENTS

| | | | |
|---|---|---|---|
| 6,041,306 | A | 3/2000 | Du et al. |
| 6,430,538 | B1 | 8/2002 | Bacon et al. |
| 6,505,176 | B2 * | 1/2003 | DeFrancesco et al. ......... 705/38 |
| 6,571,246 | B1 * | 5/2003 | Anderson et al. ............ 707/10 |
| 6,907,451 | B1 * | 6/2005 | Mukundan et al. .......... 709/204 |
| 2002/0152254 | A1 * | 10/2002 | Teng ......................... 709/100 |
| 2002/0196479 | A1 * | 12/2002 | Simske ....................... 358/474 |
| 2003/0018481 | A1 * | 1/2003 | Zhou et al. ................... 705/1 |
| 2003/0023527 | A1 * | 1/2003 | Wilce et al. ................. 705/35 |
| 2003/0050821 | A1 * | 3/2003 | Brandt et al. ................. 705/9 |
| 2004/0006589 | A1 * | 1/2004 | Maconi et al. .............. 709/202 |
| 2004/0122701 | A1 * | 6/2004 | Dahlin et al. .................. 705/2 |
| 2004/0122835 | A1 * | 6/2004 | McKibben et al. .......... 707/100 |
| 2004/0133413 | A1 * | 7/2004 | Beringer et al. .............. 703/22 |
| 2004/0252123 | A1 * | 12/2004 | Estrada et al. .............. 345/501 |
| 2004/0260593 | A1 * | 12/2004 | Abraham-Fuchs et al. ..... 705/8 |
| 2005/0120330 | A1 * | 6/2005 | Ghai et al. .................. 717/101 |
| 2005/0192963 | A1 * | 9/2005 | Tschiegg et al. .............. 707/9 |

FOREIGN PATENT DOCUMENTS

WO    WO 02/03297 A2    1/2002

OTHER PUBLICATIONS

Weske, Mathias, et al., "A Reference Model for Workflow Application Development Processes", ACM Database, 1999.*
International Search Report, International Application No. PCT/US04/21826, Filing Date Jul. 9, 2007, Mailing Date of Search Report Jul. 16, 2007.
Mathias Weske, Thomas Goesmann, Roland Holten and Rudiger Striemer; "A Reference Model for Workflow Application Development Processes", Feb. 1999, 10 pages.

* cited by examiner

*Primary Examiner*—Rachna S Desai
(74) *Attorney, Agent, or Firm*—Banner & Witcoff, Ltd.

(57) ABSTRACT

An apparatus and method is provided for deconstructing or "reverse engineering" one or more documents into a workflow process by identifying various phases, steps, and questions that arise from the document. Using an editing tool, a user selects text portions of a document and specifies one or more workflow parameters associated with the text, such as a question that will be generated to elicit information corresponding to the selected text. The document is tagged and used to generate a data structure used to execute the workflow process at a later time. The data structure can be modified to change the workflow structure.

39 Claims, 22 Drawing Sheets

Action Plan for Sale of Property

This document summarizes the plan for Colonial Associates to sell property located at 250 Lafayette Street in Boston, Massachusetts.

I. Description of Property

The property includes one building of circa 1,500 square meters on one hectare of land. The building is currently occupied. The principal use of the buildings is office. The current owner has owned the property since 1983. The current book value of the property is $1.5 million. Colonial management has agreed to vacate the building.

II. Summary of Marketing Plan and Expected Results

A. Highest and Best Use: Colonial believes that the best use of the property for selling purposes is office. The proposed transaction would be a direct sale.

B. Proposed Offering Price: The proposed sale price for the property is $2.8 million. It is realistic to expect a final sale price of $2.5 million. It is reasonable to assume a period of 6 months to find a buyer, sign a contract, and complete the transaction.

C. Expected Financial Result: The expected final selling price would result in a pre-tax profit of $1.0 million. The company has no mortgage loans against the property. The expected final selling price would result in payment of capital gains taxes. The expected capital gains tax would be $.2 million.

FIG. 5A

Action Plan for Sale of Property — 501

This document summarizes the plan for <u>Colonial Associates</u> to sell property located at <u>250 Lafayette Street</u> in <u>Boston, Massachusetts.</u> — 504    — 503    — 502

I. Description of Property    505    506

The property includes <u>one building</u> of circa <u>1,500 square meters</u> on <u>one hectare</u> of land. The building is currently <u>occupied</u>. The principal use of the building is <u>office</u>. The current owner has owned the property since <u>1983</u>. The current book value of the property is <u>$1.5 million</u>. <u>Colonial management has agreed to vacate the building</u>.

II. Summary of Marketing Plan and Expected Results

A. Highest and Best Use: <u>Colonial Associates</u> believes that the best use of the property for selling purposes is office. The proposed transaction would be a <u>direct sale</u>.

B. Proposed Offering Price: The proposed sale price for the property is <u>$2.8 million</u>. It is realistic to expect a final sale price of <u>$2.5 million</u>. It is reasonable to assume a period of <u>6 months</u> to find a buyer, sign a contract, and complete the transaction.

C. Expected Financial Result: The expected final selling price would result in a pre-tax profit of <u>$1.0 million</u>. The company has <u>no</u> mortgage loans against the property. The expected final selling price would result in <u>payment of capital gains taxes</u>. The expected capital gains tax would be <u>$.2 million</u>.

FIG. 5B

Action Plan for Sale of Property — 801

This document summarizes t[he plan of Colonial] Associates to sell property located in Boston, Massachusetts.

I. Description of Property

The property includes one buildin[g of ____ square] meters on one hectare of land. T[he building is] occupied. The principal use of th[e property is ____.] current owner has owned the pr[operty for ____ years. The] current book value of the property [is ____ million. Current] management has agreed to vacate the building.

802:
- RANK ORDER
- MODIFY TEXT
- CREATE QUESTION
- VISIBLE TEXT
- NONVISIBLE TEXT
- CHOOSE RESPONSES
- ADD DEPENDENCY
- INSERT PLACEHOLDER
- RE-ORDER WORKFLOW
- SUBSTITUTE TEXT
- SUBMIT

II. Summary of Marketing Plan and Expected Results

A. Highest and Best Use: Colonial Associates believes that the best use of the property for selling purposes is office. The proposed transaction would be a direct sale.

B. Proposed Offering Price: The proposed sale price for the property is $2.8 million. It is realistic to expect a final sale price of $2.5 million. It is reasonable to assume a period of 6 months to find a buyer, sign a contract, and complete the transaction.

C. Expected Financial Result: The expected final selling price would result in a pre-tax profit of $1.0 million. The company has no mortgage loans against the property. The expected final selling price would result in payment of capital gains taxes. The expected capital gains tax would be $.2 million.

Action Plan for Sale of Property

This document summarizes t[  
Associates to sell property located  
in Boston, Massachusetts.

| RANK ORDER |
| PHASE ▼ |
| UPDATE | CANCEL |

I. Description of Property

The property includes one building of circa 1,500 square meters on one hectare of land. The building is currently occupied. The principal use of the building is office. The current owner has owned the property since 1983. The current book value of the property is $1.5 million. Colonial management has agreed to vacate the building.

II. Summary of Marketing Plan and Expected Results

A. Highest and Best Use: Colonial Associates believes that the best use of the property for selling purposes is office. The proposed transaction would be a direct sale.

B. Proposed Offering Price: The proposed sale price for the property is $2.8 million. It is realistic to expect a final sale price of $2.5 million. It is reasonable to assume a period of 6 months to find a buyer, sign a contract, and complete the transaction.

C. Expected Financial Result: The expected final selling price would result in a pre-tax profit of $1.0 million. The company has no mortgage loans against the property. The expected final selling price would result in payment of capital gains taxes. The expected capital gains tax would be $.2 million.

Action Plan for Sale of Property

This document s
Associates to sell p
in Boston, Massach

MODIFY WORKFLOW TEXT

DEVELOP ACTION PLAN

UPDATE    CANCEL

I. Description of P

The property includes one building of circa 1,500 square meters on one hectare of land. The building is currently occupied. The principal use of the building is office. The current owner has owned the property since 1983. The current book value of the property is $1.5 million. Colonial management has agreed to vacate the building.

II. Summary of Marketing Plan and Expected Results

A. Highest and Best Use: Colonial Associates believes that the best use of the property for selling purposes is office. The proposed transaction would be a direct sale.

B. Proposed Offering Price: The proposed sale price for the property is $2.8 million. It is realistic to expect a final sale price of $2.5 million. It is reasonable to assume a period of 6 months to find a buyer, sign a contract, and complete the transaction.

C. Expected Financial Result: The expected final selling price would result in a pre-tax profit of $1.0 million. The company has no mortgage loans against the property. The expected final selling price would result in payment of capital gains taxes. The expected capital gains tax would be $.2 million.

FIG. 8C

Action Plan for Sale of Property

This document summarizes the plan for Colonial Associates to sell property located at 250 Lafayette Street in Boston, Massachusetts.

I. Description of Property — 803

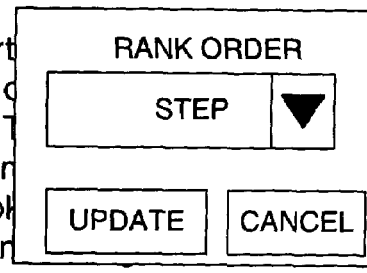

The propert... of circa 1,500 square meters on ... building is currently occupied. ... building is office. The current own... erty since 1983. The current book... $1.5 million. Colonial managemen... e building.

II. Summary of Marketing Plan and Expected Results

A. Highest and Best Use: Colonial Associates believes that the best use of the property for selling purposes is office. The proposed transaction would be a direct sale.

B. Proposed Offering Price: The proposed sale price for the property is $2.8 million. It is realistic to expect a final sale price of $2.5 million. It is reasonable to assume a period of 6 months to find a buyer, sign a contract, and complete the transaction.

C. Expected Financial Result: The expected final selling price would result in a pre-tax profit of $1.0 million. The company has no mortgage loans against the property. The expected final selling price would result in payment of capital gains taxes. The expected capital gains tax would be $.2 million.

FIG. 8D

Action Plan for Sale of Property

This document summarizes the plan for Colonial Associates to sell property located at 250 Lafayette Street in Boston, Massachusetts.

I. Description of Property

804

The property includes one building of circa 1,500 square meters on one hectare of land. The building is currently occupied. The principal ffice. The current owner has owne 983. The current book value of the Colonial management has agreed

RANK ORDER

QUESTION ▼

UPDATE   CANCEL

II. Summary of Marketin sults

A. Highest and Best Use: Colonial Associates believes that the best use of the property for selling purposes is office. The proposed transaction would be a direct sale.

B. Proposed Offering Price: The proposed sale price for the property is $2.8 million. It is realistic to expect a final sale price of $2.5 million. It is reasonable to assume a period of 6 months to find a buyer, sign a contract, and complete the transaction.

C. Expected Financial Result: The expected final selling price would result in a pre-tax profit of $1.0 million. The company has no mortgage loans against the property. The expected final selling price would result in payment of capital gains taxes. The expected capital gains tax would be $.2 million.

FIG. 8E

Action Plan for Sale of Property

This document summarizes the plan for Colonial Associates to sell property located at 250 Lafayette Street in Boston, Massachusetts.

I. Description of Property  — 805

The property includes [one building] of circa 1,500 square meters on one hectare of land. The building is currently occupied. The princi[...]
current owner has ov[...]
current book value of [...]
management has agre[...]

CREATE QUESTION

HOW MANY BUILDINGS ARE THERE?

UPDATE    CANCEL

II. Summary of Marke[...]

A. Highest and Best Use: Colonial Associates believes that the best use of the property for selling purposes is office. The proposed transaction would be a direct sale.

B. Proposed Offering Price: The proposed sale price for the property is $2.8 million. It is realistic to expect a final sale price of $2.5 million. It is reasonable to assume a period of 6 months to find a buyer, sign a contract, and complete the transaction.

C. Expected Financial Result: The expected final selling price would result in a pre-tax profit of $1.0 million. The company has no mortgage loans against the property. The expected final selling price would result in payment of capital gains taxes. The expected capital gains tax would be $.2 million.

FIG. 8F

DUE DILIGENCE REPORT FOR ABC CORPORATION

PREPARED BY: JOHN Q. SMITH, AUDITOR

I. BACKGROUND INFORMATION ~1001

The ABC CORPORATION is a Delaware corporation with headquarters located at 100 Main Street, Suite 500, New York, NY 10020. It is a publicly traded company founded in 1975. Its registered agent for service of process is [DEFERRED].

FIG. 10

PHASE I: OBTAIN BASIC CORPORATE INFORMATION — 1101

1. COMPANY NAME: ABC CORPORATION
DETAILS ○ DEFER UNTIL LATER — 1102

2. STATE/DATE OF INCORPORATION: DELAWARE — 1103A
1975 — 1103B
DETAILS ○ DEFER UNTIL LATER — 1103

3. REGISTERED AGENT: [ ]
DETAILS ● DEFER UNTIL LATER — 1104 / 1107

4. PUBLICLY TRADED ● YES
○ YES
DETAILS ○ DEFER UNTIL LATER — 1105

5. CORPORATE HEADQUARTERS
100 MAIN STREET
SUITE 500
NEW YORK | NY | 10020
DETAILS ○ DEFER UNTIL LATER
1109 — BACK | NEXT — 1108
— 1106

FIG. 11

```xml
- <transaction-type id="012">
- <workflow>
- <phase id="001">
  <name>Develop Action Plan</name>
- <title>
  Action Plan for Sale of Property
  <term-ref term-name="Property.City" />
  </title>
- <header>
  This document summarizes the plan for
  <term-ref term-name="Transaction.CounterParty" />
  to sell property located at
  <term-ref term-name="Property.FullAddress" />
  .
  </header>
  <step-ref step-id="002" order="1" />
  <step-ref step-id="012" order="2" />
  </phase>
- <step id="002">
  <name>Description of Property</name>
  <question-ref id="004" order="1" />
  <question-ref id="005" order="2" />
  <question-ref id="006" order="3" />
  <question-ref id="007" order="4" />
  <question-ref id="008" order="5" />
  <question-ref id="009" order="6" />
  <question-ref id="010" order="7" />
  <question-ref id="011" order="8" />
  </step>
- <question id="004">
  <name>Number of Buildings</name>
  <workflow-text>How many buildings?</workflow-text>
- <deliverable-text mode="workflow">
  The property includes
  <answer />
  building(s)
  </deliverable-text>
- <uiobjects>
  <uiobject type="Text" order="1" />
  </uiobjects>
  </question>
- <question id="005">
  <name>Type of Transaction</name>
  <workflow-text>What type of transaction?</workflow-text>
- <deliverable-text mode="workflow">
  The proposed transaction would be a
  <answer />
  .
  </deliverable-text>
- <uiobjects>
  <uiobject type="choice" choices="direct sale;sale/leaseback;sale of shares" order="1" />
  </uiobjects>
  </question>
  </workflow>
  </transaction-type>
```

CREATING AND CUSTOMIZING A WORKFLOW PROCESS FROM A DOCUMENT

BACKGROUND OF THE INVENTION

Various schemes for creating and executing a workflow process have been proposed. As used herein, the terms "workflow process" or "executing a workflow process" refer to executing steps of a business process using software tools. For example, U.S. Pat. No. 6,571,246 describes a method for managing a workflow using the Internet. As another example, U.S. Pat. No. 6,505,176 describes a system for automatically coordinating workflow among various workgroups in a credit application process. As yet another example, U.S. published patent application number 2002/0095311 to the present inventor describes a technique for facilitating a business process involving negotiation of a contract. In one variation of that technique, two negotiators are provided with structured steps for negotiating a contract, and are permitted to defer agreement on certain aspects of the contract until a later phase of the negotiation process.

The creation of a workflow process to carry out a business process usually begins by defining steps and parameters of that process, followed by development of customized computer software to execute the process. Such a creation method may be difficult or unwieldy for a novice user. It may be cumbersome to think abstractly about steps that should be executed and the order in which they must be executed. Moreover, the creation of custom-made software is expensive and time-consuming.

Another way of approaching the problem is to start backwards, by looking at the resulting product or products of the business process, and using those products to discern the structured process used to create them. In many business processes, the resulting product is a document or set of documents, such as a lease; a business proposal; a due diligence report; or the like. Consequently, it would be an improvement to be able to create and modify a workflow process by deconstructing or "reverse engineering" one or more documents resulting from the business process.

SUMMARY OF THE INVENTION

The invention provides a computer-implemented system and method for creating and modifying a workflow process by starting with a document resulting from that workflow process. The document is tagged using a software tool that permits parts of the document to be selected and associated with one or more parameters of the workflow process, such as a phase of the process in which it will be executed. After the document has been suitably tagged, the tagged document is converted into a data structure that is used to drive a transaction engine that executes an ordered sequence of steps that prompt a user of the business process tool for information. After the user enters the information in accordance with the workflow process, the transaction engine generates a new document reflecting a new execution of the business process.

Other aspects of the invention permit the workflow process to be modified by changing the order or arrangement of steps in the process, such that steps are assigned to different phases of the business process, or by permitting certain steps or questions in the process to be deferred to a later phase of the process. In this manner, users may experiment to determine the optimal workflow method to meet their objectives.

Other features and advantages will become apparent through the following detailed description and figures.

BRIEF DESCRIPTION OF THE DRAWINGS

FIG. 5A shows a document describing a proposed sale of property that represents the work product from a workflow process.

FIG. 5B shows the document of FIG. 5A annotated to show those aspects of the document that typically vary from one transaction to the other, and that can be selected by a user to create a workflow process according to the invention.

FIG. 8A shows how a user can select text 801 in the document and use a drop-down menu 802 to designate workflow parameters for the selected text.

FIG. 8B shows how a user can specify that a selected portion of the document 801 is to be associated with a phase in the workflow process.

FIG. 8C shows how a user can specify text that will be displayed when the associated phase is executed during the workflow process.

FIG. 8D shows how a user can specify that a selected portion of the document 803 is to be associated with a step in the workflow process.

FIG. 8E shows how a user can specify that a selected portion of the document 804 is to be associated with a question in the workflow process.

FIG. 8F shows how a user can create a question to be associated with a selected portion of the document 805, wherein the question will be displayed in a prompt during the workflow execution process.

FIG. 10 shows another example of a document being deconstructed or "reverse engineered" into a workflow process, which is then executed in FIG. 11.

FIG. 11 shows an example of executing the workflow process corresponding to the deconstructed document of FIG. 10.

FIG. 16 shows a sample XML document generated as a result of the deconstruction process.

DETAILED DESCRIPTION OF THE INVENTION

Before describing the creation of a workflow process from a document and the customization of that workflow process according to the inventive principles, it will be helpful to first describe an exemplary execution of a workflow process. Suppose that a business employee acting in the capacity of a landlord wants to negotiate a potential lease with a prospective tenant. Rather than performing this negotiation using an ad hoc process, it is possible to structure the negotiation using a computer-implemented process such that each party (landlord and tenant) is guided through a series of phases in which predefined milestones are achieved.

One example of this process is shown in published PCT application number WO 02/03297 to the present inventor. As shown in that publication and as summarized briefly here, each phase of the negotiation is broken down into lower-level steps having associated questions that require input by one or both of the parties. Some of the steps can be deferred at the election of the negotiators in order to avoid reaching a roadblock beyond which progress is not possible.

Figure 1:
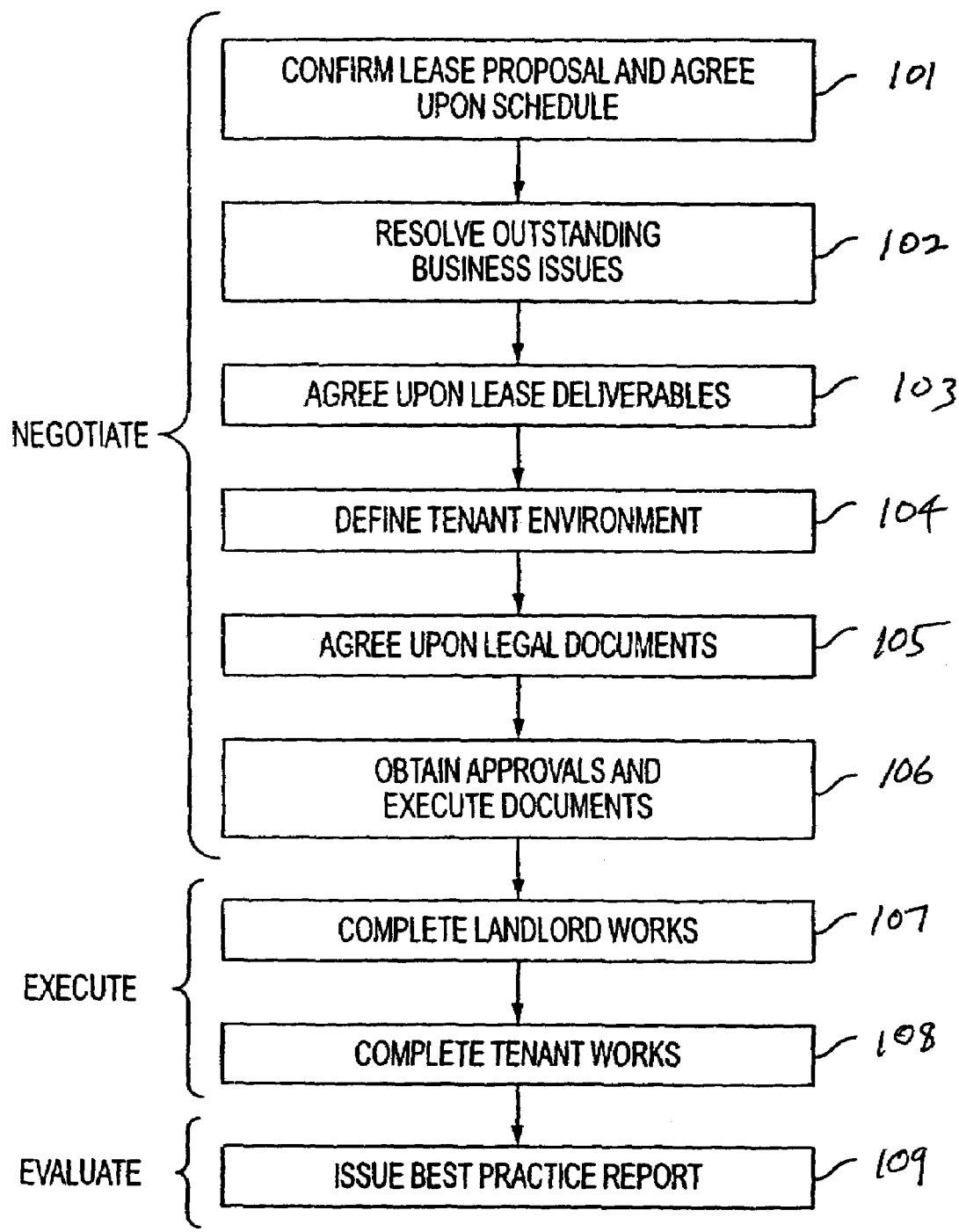
FIG. 1 shows a negotiation process for a lease that has been structured into a series of nine phases.

As shown in FIG. 1, for example, the process of negotiating a lease can be broken down into distinct phases 101 through 109, each of which pertains to a different aspect of the lease negotiation. In phase 101, for example, the parties confirm a basic lease proposal and agree upon a schedule. In phase 102, the parties resolve any outstanding business issues remaining from the first phase. The remaining phases involve other aspects of the negotiation.

Figure 2:
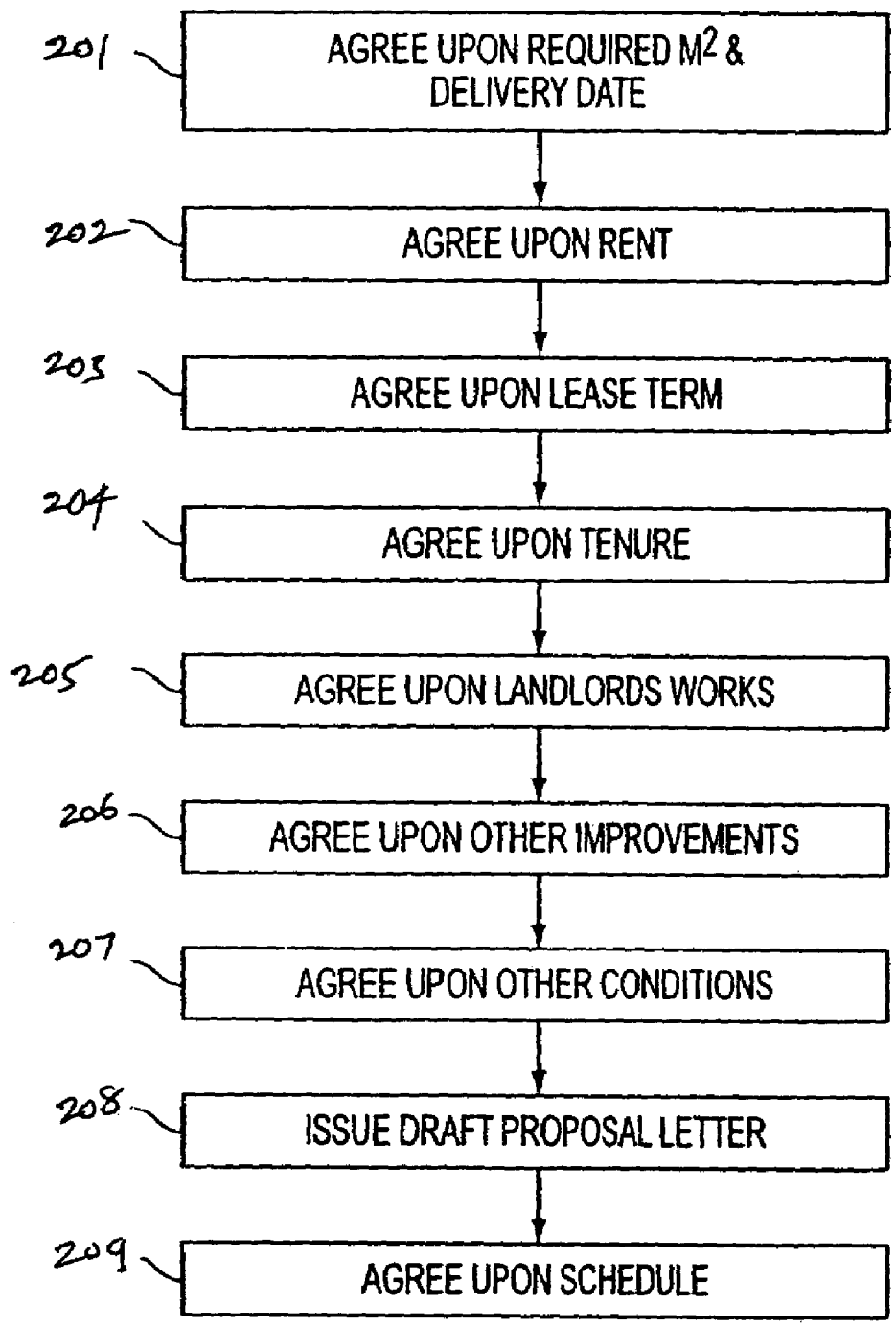
FIG. 2 shows steps that are performed during the first of the nine phases in FIG. 1.

FIG. 2 shows further details of the first phase 101, illustrating how the first phase comprises distinct steps that are performed to complete the first phase of the negotiation. For example, the first phase includes a first step 201 of reaching agreement on the required square footage of the lease and the delivery date for the leased property. The second step 202 pertains to reaching agreement on the rent, and so forth. Each step may comprise one or more subsidiary questions that must be answered or agreed upon by the parties in order to complete the steps (and, ultimately, the phases) of the negotiation.

Figure 3:
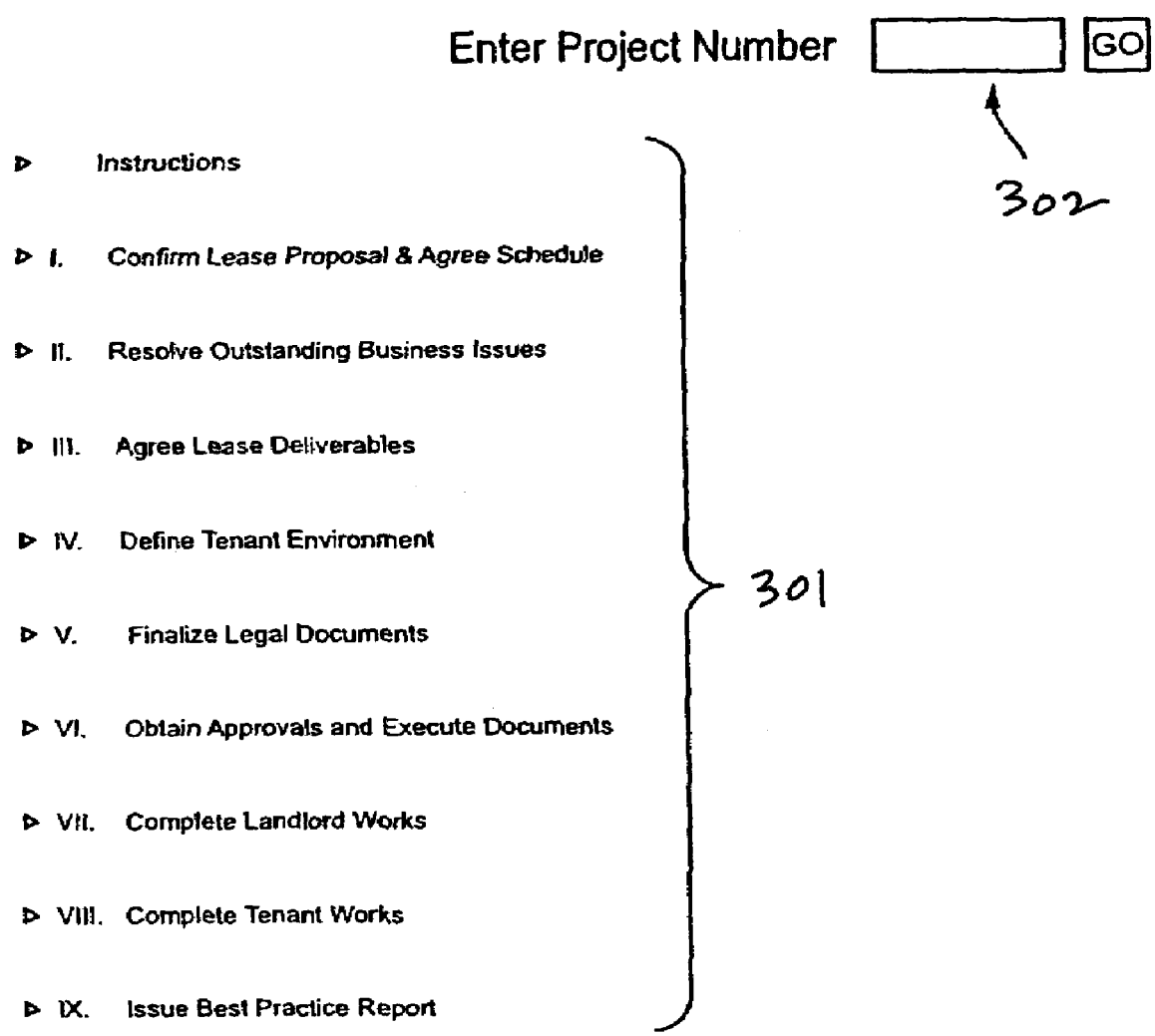
FIG. 3 shows a computer screen allowing a user to select one of the nine phases of FIG. 1.

FIG. 3 shows a computer screen generated by a computer program depicting nine phases that can be selected by a user and that are associated with a particular project number 302 (for example, a particular lease negotiation). By clicking on one of the phases, the user is provided with one or more detailed screens showing the steps and associated questions contained in the phase, allowing each user to enter information to conduct the negotiation using a structured workflow process.

Figure 4:
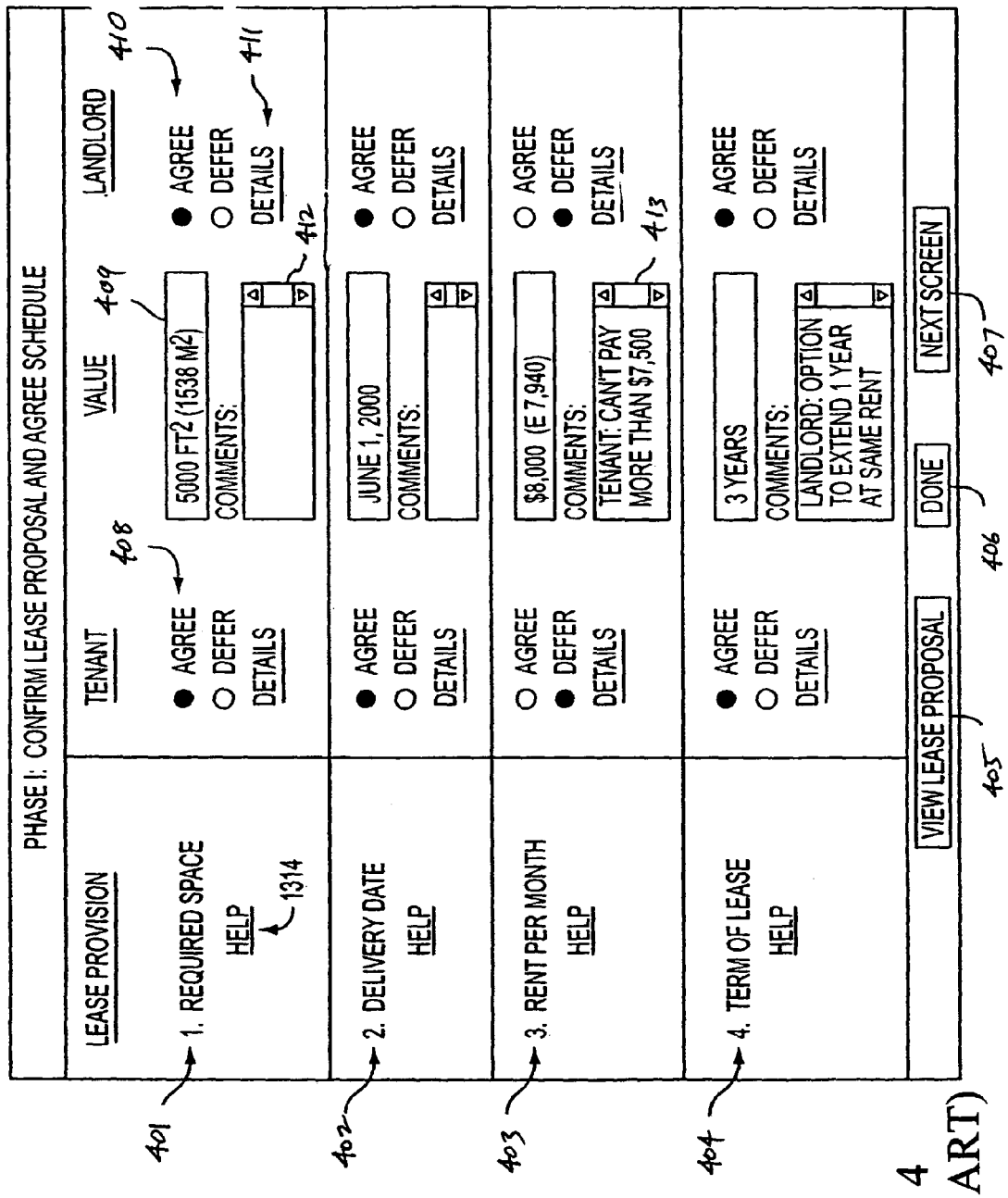
FIG. 4 shows a computer screen allowing users (a landlord and a tenant, for example) to enter information to complete steps associated with the first phase of FIG. 1 according to a structured workflow process.

FIG. 4 shows a computer screen illustrating steps 401 through 404 corresponding to a first phase of the negotiation process. Each step 401 corresponds to a particular lease provision, such as the required floor space for the lease, and the computer program permits each party to the negotiation to enter a response to a question (409 and 412) as well as indicating agreement (408 and 410) to the particular response. After the parties enter responses to the questions, they may view a draft lease proposal containing the agreed-upon provisions by clicking a button 405. The parties may also move on to a next screen (corresponding to another set of questions within the phase, or to a next phase) by selecting a button 407. The process continues until the parties have entered and agreed upon information necessary to produce a lease proposal. The lease proposal (i.e., the resulting work product) can then be generated based on a template using the agreed-upon information to fill in the blanks.

The above example assumes that a business process (for example, the negotiation of a lease) has been decomposed into phases, steps, and questions. Phases may correspond, for example, to major segments of the process and may result in the generation of a document (for example, a lease). Each phase may contain one or more steps corresponding to smaller increments of the process that are logically grouped into manageable sections that may be displayed on a single computer screen. Each step in turn may contain one or more questions that prompt the user to enter information.

In the above example, it is presumed that someone has developed and arranged the various phases, steps, and associated questions using computer software such that the process can be conducted as described. In other words, details of the process had to be worked out before the automated software tool could be used the first time.

According to one aspect of the present invention, a completed document can be used as the basis for creating the various phases, steps, and questions depicted in FIGS. 1 through 4. The user need not create a custom computer program in order to generate the structured workflow process illustrated above, but can instead use a computer system that permits a user with ordinary skill to manipulate each of the above parameters to achieve the optimal process.

As another example, suppose that a business executive needs to develop a detailed plan for a sale of company property. The plan must conform to a particular format, such as that shown in FIG. 5A. As shown in FIG. 5A, the plan includes a first section that describes the property (e.g., how many square meters of space; whether the building is occupied; the principal use of the buildings, etc.) and a second section that summarizes the marketing plan and expected results of the sale, including various details.

Suppose that the business executive drafts dozens of plans for the sale of different properties each year, each having a format similar to that shown in FIG. 5A. It should be apparent that many parts of the document would remain unchanged from one sale to the next, whereas other parts of the document would change depending on the nature of the particular sale. One approach for simplifying the executive's task would be to spend time creating a special form or a document macro that prompts the user to fill in each changeable entry, and providing a skeletal document for the unchanged text. This requires knowledge of the form creation or macro creation process, which can be complicated or involve programming skills. Additionally, macros provide only a limited ability to request information once started.

FIG. 5B shows the document of FIG. 5A, wherein portions of the document that may change from one incarnation of the document to another are highlighted. According to one aspect of the invention, the user is able to start with a completed document; highlight or select those portions of the document that vary from one document to another, and specify for each such portion how and when the information should be elicited during the workflow process execution. Each selected portion is converted into a phase, step, or question that is presented during the workflow execution process. In effect, the user is able to "reverse engineer" the workflow process from the document, rather than creating the workflow process from scratch. This greatly simplifies the user's job and makes it amenable to use by users who have no programming experience. It also offers the potential to add other documents with other phases, steps, and questions that may accelerate the process.

For example, as indicated in FIG. 5B the title of the document is "Action Plan for Sale of Property" (element 501). By highlighting the title of the document and then right-clicking a mouse button, the user is able to designate this as a phase of the workflow process, and to specify a name for the phase during the workflow execution process. The user can also highlight text such as 505 and convert the text into a question that will be presented as part of the workflow process. These and other features are described in more detail below.

In the example of FIG. 5B, a single phase could be created corresponding to the entire document relating to an action plan for sale of a piece of property. This phase might be one of several phases in a larger business process involving the sale of the property; the financing arrangements for the property; the purchase of insurance for the property; and other things. Within the phase shown in FIG. 5B, two steps can be discerned: A first step corresponding to describing the property that is the subject of the action plan ("I. Description of Property"), and a second step corresponding to marketing of the property ("II. Summary of Marketing Plan and Expected Results"). Each of these steps in turn contains subsidiary questions that can be asked of the user during workflow execution, such as how many buildings are involved (element 505) and how many square feet are in the building (element 506).

In short, the document shown in FIG. 5B can be "deconstructed" into a phase, two steps, and several subsidiary questions. Once this information is extracted from the document and supplemented with certain other information as described below, the workflow process can be executed to prompt the user to enter information according to the phase, two steps, and multiple questions but for a different property (i.e., one other than 250 Lafayette Street).

Figure 6:
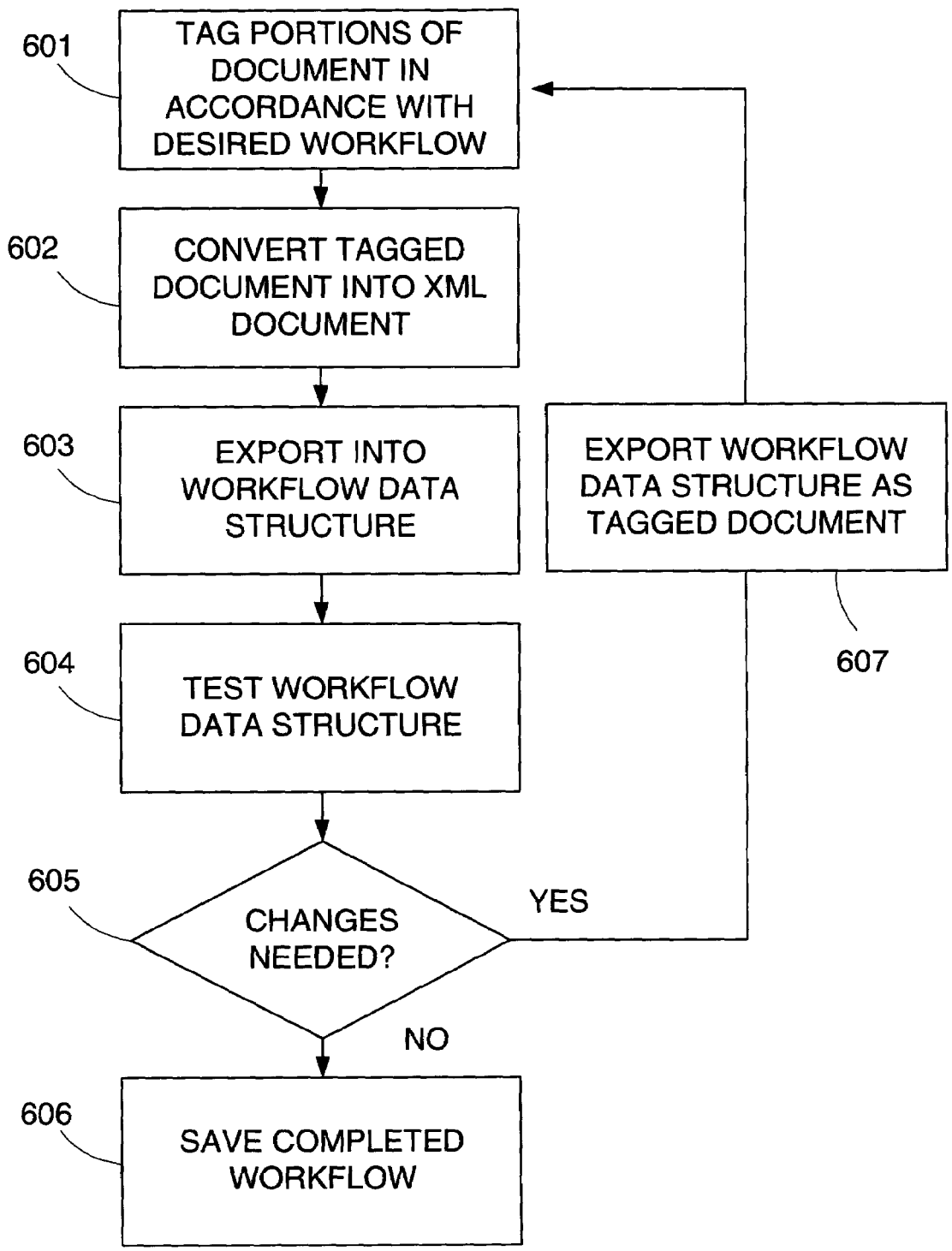
FIG. 6 shows steps for carrying out various principles of the invention.

FIG. 6 shows steps for carrying out various principles of the invention. In one embodiment, a user tags a previously completed document (e.g., a previously drafted lease; due diligence report; business plan; or any other business related document or documents) in such a way that certain portions of the document are traceable to and controlled by a particular phase, step, and/or question in the workflow process. Beginning in step 601, the document is tagged using a software tool that permits the user to specify the order in which the tagged information must be provided within the workflow process; the question or questions that the user will be asked in order to elicit the desired information; and (optionally) the range of acceptable answers for the question. In one variation, the software tool comprises an editor that permits the user to highlight portions of the document and, using a mouse right-click button menu, select workflow parameters pertaining to the highlighted text. Further details of this step are provided with reference to FIG. 7.

In step 602, in one variation the tagged document is converted into an XML (Extensible Markup Language) document that defines a semantically structured representation of the workflow process and deliverable document (see FIG. 16). The XML document may be created "on the fly" (i.e., as phases, steps, and/or questions are tagged into the document, a parallel XML document is incrementally updated), or the XML document may be created once after all edits have been made.

In step 603, the XML document is exported into a data structure that is used to drive a structured transaction engine (described below). The structured transaction engine generates computer screens of the type illustrated in FIG. 4, so that a user is prompted to enter information in a structured manner (e.g., according to a set of phases containing questions arranged in a series of steps). The data structure in essence defines the workflow process, which is executed by the structured transaction engine. In one embodiment, the XML document itself may serve as the data structure, such that the structured transaction engine can execute the workflow based directly on the XML document.

In step 604, the user tests the workflow structure. For example, the user executes the various phases and steps defined by the workflow process to determine if it elicits information of the desired type and in the desired order. If in step 605 it is determined that changes are needed, the workflow data structure is exported as a tagged document (step 607) and the process returns to step 601 where the tagged portions of the document can be changed. For example, a portion of a document that was previously identified as being associated with question 3 of phase 2 of the process can be re-ordered such that it is elicited as question 2 of phase 1 of the process. When no more changes are needed, the process is completed at step 606 and the workflow data structure is stored for later use. The document may be retrieved at a later date to make subsequent changes to a workflow process, which will modify the data structure.

Figure 7:
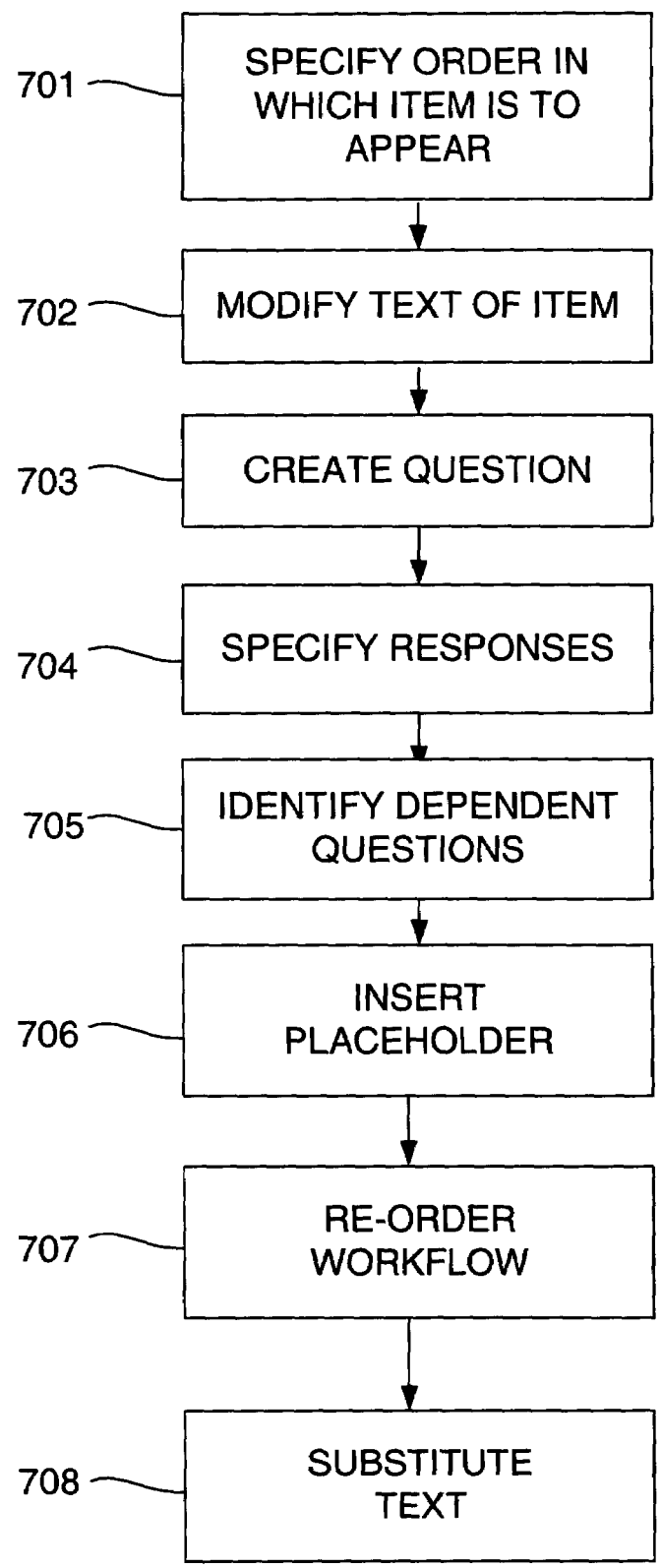
FIG. 7 shows further details of step 601 of FIG. 6.

FIG. 7 shows further details of step 601 of FIG. 6. According to one variation of the invention, a document editing tool allows the user to select text in the document and then execute functions associated with the selected text. Turning briefly to FIG. 8A, the user has selected text portion 801 corresponding to the title of the document. The text can be selected using a cursor selection function as is well known in the art. Then, by clicking on a right mouse button, the user is presented with a drop-down menu 802 pertaining to the selected text. The user selects one or more functions from the drop-down menu 802, which permit the user to specify process workflow parameters associated with the selected text. In an alternative embodiment, the choices can be made by voice using a voice recognition system or by other means.

Returning to FIG. 7, in step 701 the user is presented with an option for specifying the order in which the item is to appear in the workflow (corresponding to "RANK ORDER" in the menu of FIG. 8A). In one variation, text in the document can be classified as belonging to three descending levels: a phase; a step; or a response to a question. For example, a user can highlight the text "Action Plan for Sale of Property," right click the "Rank Order" function, and then identify the text as a "phase." See FIG. 8B. This signals to the software that the selected text (and text that follows it) is associated with a first phase of the workflow process. When the user selects text following the text corresponding to the first phase and identifies that text as a step or question, the software can determine (based on the fact that it follows the first phase) that the step or question is associated with the first phase. Similarly, when the user selects text following the first step and identifies it as a question, the software can determine (based on the fact that it follows the first step) that the question is associated with the first step. If another phase is highlighted later in the document, the software will know that it corresponds to the second phase (and the text following it, containing steps and questions, also will belong to that second phase). In this manner, the software is able to maintain the ordering of phases, steps, and questions.

Alternatively, in a voice recognition embodiment of the system, text may be identified verbally by highlighting the text, right clicking the "Rank Order" function, and saying, "phase." Verbal instructions may also be carried out for all succeeding functions.

In step 702, the user may choose to alter the text for presentation in a workflow. For example, the words, "Action Plan for Sale of Property" in the resulting document may be better described during the automated workflow as "Develop Action Plan." This modification can be done by highlighting the text, then clicking on a "Modify Text" function, which displays a box into which the text could be written (corresponding to "MODIFY TEXT" option in FIG. 8A). See FIG. 8C, showing how the user can specify text that will be displayed when the associated phase is encountered during workflow execution. The changes are then automatically registered in the workflow data structure, while the original document would not be altered.

The user follows the same procedure to designate steps within a document. For example, FIG. 8D shows how a user has selected text 803 ("I. Description of Property") and has designated that text as corresponding to a step. If it is the first step designated after the first phase was designated, the software knows to make it the first step. The next designated step would become the second step, and so forth.

In step 703, the user can create a question to be presented when the workflow is executed (see "CREATE QUESTION" option in FIG. 8A). As shown in FIG. 8E, the user selects text 804 and indicates that this is to be associated with a question. Next, as shown in FIG. 8F, the user selects text 805 and selects the "CREATE QUESTION" function and the user is provided with a text box into which a question corresponding to the highlighted text will be asked when the workflow process is executed. In this example, the selected text pertains to the number of buildings involved in the sale, so the user creates a question such as "HOW MANY BUILDINGS ARE THERE?"

There are many different ways of creating questions. As one example, the user can create a question based on text visible in the document. The sentence, "The current book value of the property is $1.5 million" clearly indicates the nature of the question to be asked. Assume that "$1.5 million" has already been identified as a response. A user can highlight the entire sentence and then right click on the "Create Question from Visible Text" function (see FIG. 8A). The user would then type into a text box the question, "What is the book value of the property?" and the system will automatically link this question with the response, "$1.5 million."

As another example, the user can create questions that are not visible in the document, but rather which are inferred based on the response. For example, the first sentence references "the plan for Colonial Associates to sell property." It may be inferred that Colonial Associates is the owner of the property. However, the text does not expressly confirm this fact. A user can highlight the "Colonial Associates" response and then click on the "Create Question from Non-visible Text" function (see FIG. 8A). A text box appears into which the user would type the question, "Who is the owner of the property?" The system would automatically link this question with the response, "Colonial Associates". In a further embodiment, a user could designate text as a "factual term" that would be placed in an entry form associated with the workflow.

In another embodiment, the questions can be presented as a simple request. For example, the question "What is the name of the seller?" could be presented as simply, "Name of seller."

In step 704, the user can select from among the proper type of responses for a particular question (see "CHOOSE RESPONSES" option in FIG. 8A). For example, the document states that, "The proposed transaction would be a direct sale." A user can select the words "direct sale" and then click on the "Choose Responses" function. The user can then select from a menu of response categories such as yes/no buttons, date box, currency box, measurement box, open text box, or multiple choice box, and could further enter the choices "direct sale", "sale/leaseback", of "sale of shares" into a text box. The workflow system would automatically link these responses to the question, "What is the proposed transaction?"

In step 705, the user can identify dependencies among questions (see "ADD DEPENDENCY" option in FIG. 8A). Text may contain dependent questions whose appearance depends on the type of response to a prior question. For example, consider the sentences, "The expected final selling price would result in payment of capital gains taxes. The expected capital gains tax would be $0.2 million." If, in fact, no capital gains taxes were payable, the second sentence should not appear. Therefore, the second sentence should be classified as "dependent" upon the question of whether capital gains taxes were payable. A user can highlight the sentence, "The expected capital gains tax would be $0.2 million" and click on the "Add Dependency" function. The user would then indicate that the sentence is dependent on the sentence, "The expected final selling price would result in payment of capital gains taxes", and indicate that a "yes" response would trigger the inclusion of the dependent question in the workflow. Other embodiments include: (a) permitting the system to assume by default that a dependent sentence and question is linked to the previous sentence and question. However, the user could also highlight another sentence and click on "alternate sentence" to change this dependency. (b) Permitting the system to assume by default that the applicability of the dependent question is triggered by a "yes" response to the related question. However, if the appropriate trigger response is "no", or the response does not include a "yes" or "no" answer, the user could highlight the response, and then click on "alternate response" to change this dependency to another type of response. (c) Providing a knowledge base of more advanced logic system that would automatically determine the need to characterize a question as being "dependent", and predict the response that would trigger the application of the dependent question.

In step 706, the user can insert a placeholder (corresponding to "INSERT PLACEHOLDER" option in FIG. 8A). Documents that describe a workflow sometimes require a placeholder indicating certain omissions in the document that are part of the underlying decision making process, and which therefore should be included in the automated workflow. For example, the sentence, "The company has no mortgage loans against the property" does not contain any further information about a mortgage. However, if the company did have mortgage loans against the property, it would be necessary to calculate the outstanding mortgage balance in order to determine an expected financial result. In another example, a user may determine that there is an obvious omission in a document that should be addressed in the workflow, but wishes to note the omission without switching screens or altering the document. In both instances, the user could set a placeholder to allow for missing text and related workflow question. For example, the user could click on the "placeholder" function, and then type into the text box the question, "What is the outstanding mortgage balance?" The system would then prompt the user to insert the text as it would appear in the document, then highlight the response and select the choices. The user could then click on "ADD DEPENDENCY" to record the dependency of this question on the above mortgage question. The user would also be prompted to make further choices (not shown) such as whether the question is dependent. As an alternative, a user could choose to simply enter a symbol for a placeholder onto the text without making an entry, which would create a similar entry in the workflow indicating that a phase, step, or question needed to be added here.

In step 707, the user may choose to reorder the workflow (corresponding to "RE-ORDER WORKFLOW" option in FIG. 8A). By default, the system assumes that the workflow appears in the same order as presented in the document. Sometimes, however, the sequence for a phase, step or question in the workflow would be different than in the document. For example, consider the sentences, "The principal use of the building is office. The buildings are currently occupied." A user may wish to invert the order of the two questions related to these sentences, without changing the document text. A user could then highlight the second sentence and then click on the "reorder" function. The user would then place the question, "Is the building currently occupied?" ahead of the question, "What is the principal use of the building?"

When changes are made to the ordering of phases, steps, or questions, the software can determine how to modify the ordering of other phases, steps, or questions accordingly. For example, suppose that the user initially tags a document with three phases, which would initially appear in order in the document as P1 P2 P3, where P1 is near the beginning of the document and P3 is near the end of the document. (Steps and questions would appear within each of the phases in the document). Suppose that the user wants to change the ordering so that phase 3 (P3) becomes phase 1 (P1). In other words, even though the steps and questions associated with phase 3 appear near the end of the document, the user wants them to be elicited in the first phase during workflow execution. One way of making this ordering change is to select the text associated with phase 3 (P3), select RE-ORDER WORKFLOW, and change the number to phase 1 (P1). This would initially leave the changed ordering in the document as P1 P2 P1. The software scans the tagged document and determines that there is already a P1, so it changes the first P1 (the next lowest phase) to P2, and changes P2 to P3. This would change the ordering in the document to P2 P3 P1, which upon workflow execution would actually be executed as P1 P2 P3. A similar scheme would apply to changing an original ordering of P1 P2 P3 to P3 P1 P2 (i.e., moving the first phase to the last phase), which would be executed during workflow execution as P1 P2 P3. The same principles would apply to reordering of steps and questions within each phase. In one embodiment, placeholders can also be used to provide orderings for phases, steps, or questions that are not yet defined.

In step 708, the user may choose to substitute text (corresponding to "SUBSTITUTE TEXT" option in FIG. 8A). Sometimes it is beneficial for users to substitute text in a document while retaining a record of the original text. For example, a consultant or other user may wish to change the sentence, "The estimated cost for marketing activities is $0.1 million" to read, "Management expects that the marketing campaign would cost no more than $0.1 million." This user could highlight the current text, click on the "Substitute Text" function and then type the new sentence into a text box. The system will automatically upload and retain a record of the client's original document, which the user can subsequently access. The user may then choose whether to alter the question or response related to the substitute text.

The user follows one or more of steps 701 through 708 for each selected text portion in the document. It will be appreciated that not all of the steps in FIG. 7 need to be performed for each text item, and that some steps may be inapplicable in a particular circumstance. Once the coding process has taken place, the user clicks a "submit" function, whereupon the system asks the user to identify the destination for this coded document material. The user then selects the destination, which can be either an existing workflow or a new workflow. In one variation, the system assumes that the document will be added as the phase, step or question immediately following the last phase, step or question for a preexisting workflow or is the first phase, step or question for a new workflow. The information can be stored in a data structure for later execution.

As described below, the workflow data structure may comprise an ordered set of phases, steps, and questions, along with the workflow parameters entered as described above. This data structure can then be used to generate computer screens that prompt the user for answers to the questions according to the phases, steps, and questions identified during the deconstruction process. Alternatively, an XML file may be used as the data structure (see FIG. 16 for an example).

Once a document has been coded and saved into an XML file or other suitable data structure, it can be modified by the user at a later time.

Figure 9:
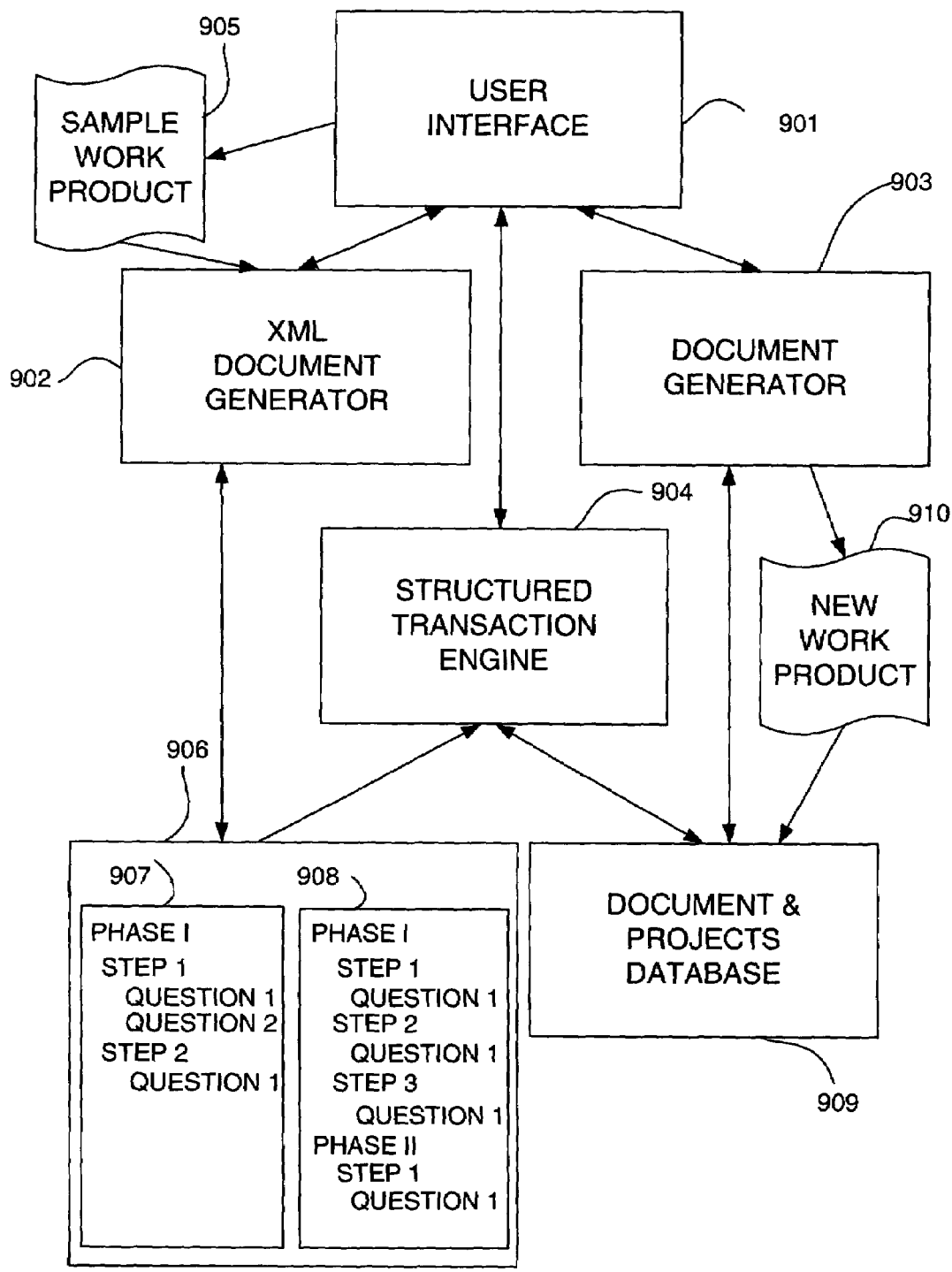
FIG. 9 shows a system employing various principles of the invention.

FIG. 9 shows one possible system for carrying out the steps shown in FIG. 6. A user interface 901 may comprise a document editor that has been augmented with selection tools (e.g., a mouse right-click menu) that permits the user to associate selected portions of document text with phases, questions, constrained answer choices, and other workflow process parameters. The user interface operates on a sample work product document 905, receives user selectable inputs, and provides them to XML document generator 902, which converts a tagged input document into an XML document. The XML document can be converted into a data structure and stored in database 906, wherein the data structure contains information for each selected text portion an indication of the phase in which it is to be presented; the step or steps associated with the text; the question or questions associated with the text; and the various other workflow constraints (e.g., acceptable responses for each question, as described above). Several different workflows 907 and 908 can be stored in database 906 corresponding to one or more documents deconstructed using the inventive principles. All of these documents could be subsequently modified to reflect changes in workflow process parameters through the document editor.

To execute the workflow structure, structured transaction engine 904 operates on each workflow data structure 907 and 908 to generate computer display screens of the type shown in FIG. 4, such that the user is presented with an ordered set of prompts for information according (in one variation) to a phase, step, and question approach. As the user enters information according to each workflow, the responses are stored in a database 909, and a document generator 903 generates new work product 910 based on the inputs entered by the user. As explained above, the structured transaction engine 904 may instead operate directly on XML documents that are created as part of the deconstruction process.

The original document can be retained (both in text form and in XML form), but the information contained in the original document is replaced based on the execution of the workflow to reflect newly elicited information. For example, the original document shown in FIG. 5B shows a book value of $1.5 million for the property. Once the original document has been deconstructed into a workflow process representing a generalized action plan for the sale of property, this number is turned into a question that is then asked at execution time. As a result, instead of displaying the figure $1.5 million, the workflow process elicits a value from the user of the workflow process and the newly elicited value is used to generate a new document.

FIG. 10 shows another example of a document that is being deconstructed into a step 1001 and multiple questions 1002 through 1007. In this embodiment, one of the questions (question 1007) is specified as DEFERRED. In certain variations of the invention, this DEFERRED information can be used to provide a DEFER option during workflow execution. For example, users could defer the response to a question regarding the book value of the property until they obtained the correct figure.

FIG. 11 shows a computer screen generated as a result of deconstructing the document of FIG. 10. As can be seen in FIG. 11, the document corresponds to a single phase having no steps and multiple questions.

Figure 12:
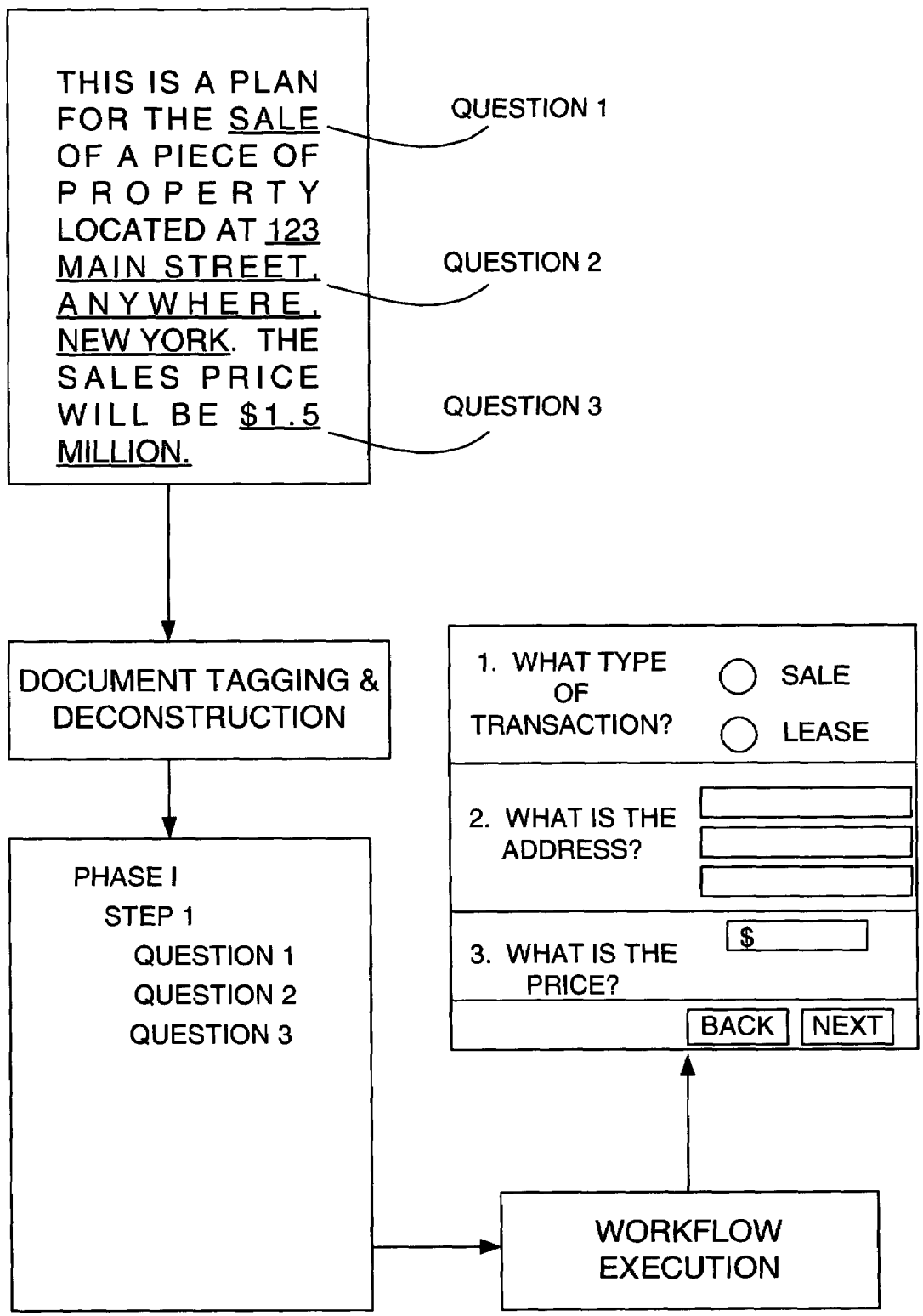
FIG. 12 shows an example of a single document (corresponding to a single phase with a single step) that is deconstructed into questions that are presented in a single computer screen upon later execution.

A workflow process may consist of a single phase that is reflected in a single document, with no steps but several questions that are arranged in a particular order to elicit information to generate the document. This is shown in FIG. 12, wherein a single document is deconstructed into a workflow data structure comprising a single phase, a single step, and 3 questions. When the workflow is executed, the user is prompted to answer the 3 questions in the order specified during the document deconstruction process.

Figure 13:
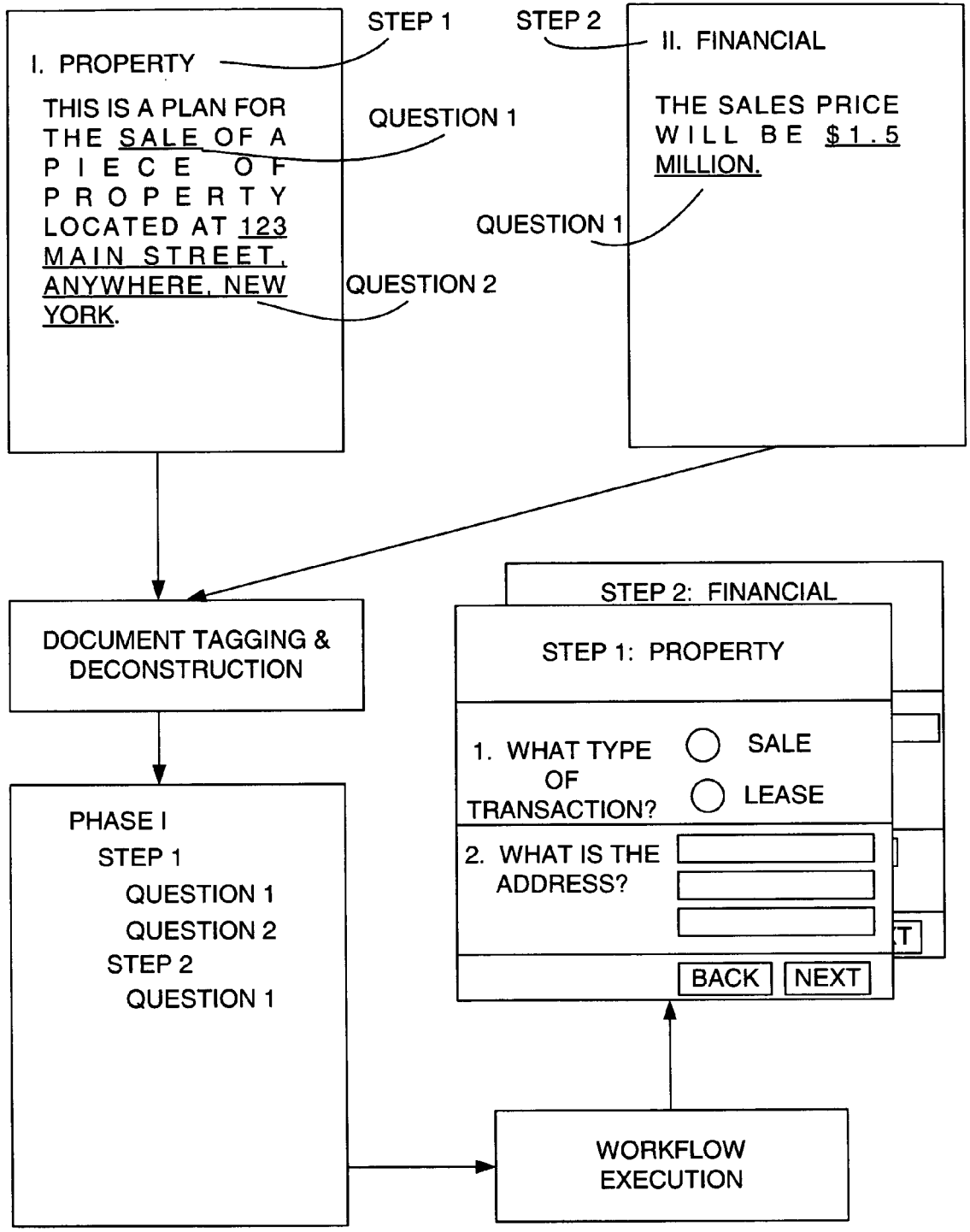
FIG. 13 shows an example of two documents (corresponding to a single phase) having two steps that are deconstructed into questions that are presented in two computer screens (one per step) upon later execution.

FIG. 13 shows an example of two documents (corresponding to a single phase) having two steps, which are deconstructed into questions that are presented in two computer screens (one per step) upon later execution.

Figure 14:
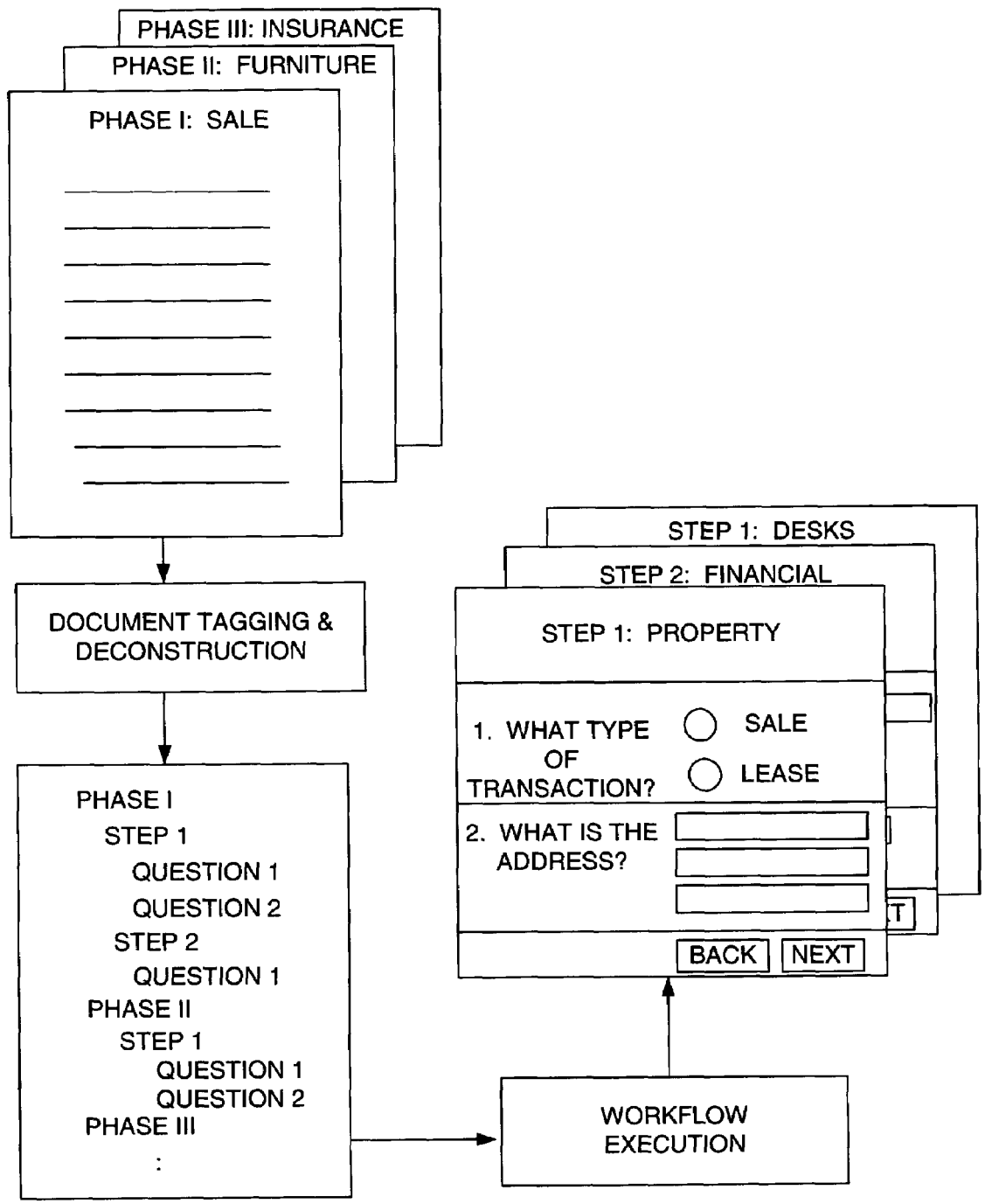
FIG. 14 shows an example of multiple documents, each corresponding to a different phase, wherein each phase is broken down into steps comprising questions, wherein each step is presented as a separate computer screen containing corresponding questions upon execution.

FIG. 14 shows an example of multiple documents, each corresponding to a different phase, wherein each phase is broken down into steps comprising questions, wherein each step is presented as a separate computer screen containing corresponding questions upon execution.

Although the above description implies that several phases are contained in a single document (i.e., the work product from a workflow process is a single document), it is of course possible to produce multiple documents as part of a workflow process. In this situation, each resulting document could be separately "reverse engineered" and converted into one or more phases, steps, and questions.

Figure 15:
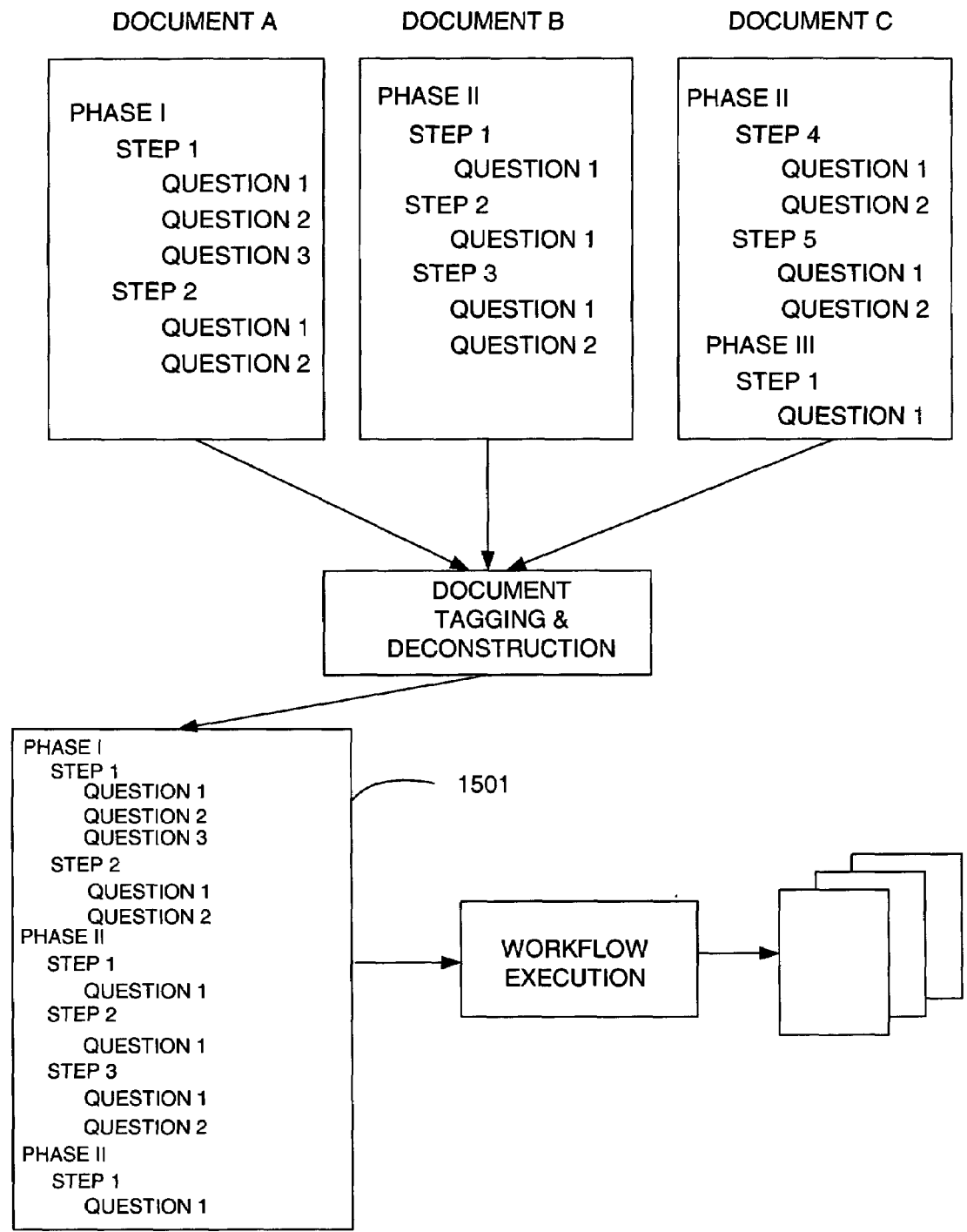
FIG. 15 shows how different phases can be distributed across multiple documents and how multiple phases can be contained in the same document.

FIG. 15 shows an example of this approach, wherein DOCUMENT A is deconstructed into a Phase I containing two steps (each with its own questions); DOCUMENT B is deconstructed into a Phase II containing three steps (each with its own questions); and DOCUMENT C is deconstructed into the rest of Phase II and into Phase III. Note that DOCUMENT C thus contains parts of two different phases. The document deconstruction process can combine the various phases and steps into a single data structure 1501 for execution, resulting in three new documents corresponding to execution of the workflow.

FIG. 16 shows one possible XML document that can be generated in accordance with various aspects of the invention.

One aspect of customization allows a user to eliminate or edit certain phases, steps and questions contained in a workflow. By right-clicking on parts of the document, the user can be provided with editing tools to change dependencies, questions, or other parameters of the workflow process. Changes can be made at a later date to a previously created and saved document.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. Any of the method steps described herein can be implemented in computer software and stored on computer-readable medium for execution in a general-purpose or special-purpose computer, and such computer-readable media is included within the scope of the intended invention. Steps in the appended claims are numbered for convenience only and such numbering should not be interpreted to imply any required ordering of steps.

I claim:

1. A computer-assisted process for converting a displayed contract text document into a workflow process, comprising the steps of:
    (1) detecting, by a computing device, a plurality of distinct user-selected text portions of the displayed contract text document;
    (2) for each of the plurality of distinct user-selected text portions, querying the user to identify at least one corresponding user-selected workflow process parameter, the at least one user-selected workflow process parameter being detected by the computing device using voice recognition;
    (3) tagging, by the computing device, the document based on the plurality of distinct user-selected text portions and corresponding user-selected workflow process parameters, said tagging correlating each user-selected text portion to a user-selected order within a computer-based contract negotiation workflow process;
    (4) storing each user-selectable text portion with corresponding user-selectable workflow process parameters into a data structure representing an ordering of information to be elicited when the workflow process is executed; and
    (5) executing the computer-based contract negotiation workflow process using the data structure as a template to drive the workflow process.

2. The computer-assisted process of claim 1, wherein the user-selected workflow process parameters comprise an ordered phase of the workflow process, wherein the ordered phase determines a first grouping of information that will be elicited when the workflow process is executed.

3. The computer-assisted process of claim 2, wherein the user-selected workflow process parameters comprise a step within the ordered phase of the workflow process, wherein the step determines the order within the phase in which corresponding information will be elicited when the workflow process is executed.

4. The computer-assisted process of claim 1, wherein the user-selected workflow process parameters comprise questions to be asked during step (5).

5. The computer-assisted process of claim 1, wherein step (1) comprises the step of displaying transaction negotiation process parameters.

6. The computer-assisted process of claim 1, wherein step (2) comprises the step of detecting user-selected modification of a label used to designate a phase.

7. The computer-assisted process of claim 1, wherein step (2) comprises the step of detecting user-selected creation of a question to be asked.

8. The computer-assisted process of claim 1, wherein step (2) comprises the step of detecting user input that defines valid responses for a question that will be asked during the workflow process.

9. The computer-assisted process of claim 1, wherein step (2) comprises the step of detecting user-selected dependencies among questions.

10. The computer-assisted process of claim 1, wherein step (2) comprises the step of detecting user-selected specification of a placeholder.

11. The computer-assisted process of claim 1, wherein step (2) comprises the step of detecting user-selected specification of a re-ordering of a previously specified workflow process parameter.

12. The computer-assisted process of claim 1, wherein step (2) comprises the step of detecting at least one user-selected specification of a phase; a step within the phase; and a question within the step.

13. The computer-assisted process of claim 1, wherein step (4) comprises the step of converting the user-selectable text portions and user-selectable workflow process parameters in step (1) into an XML document.

14. The computer-assisted process of claim 1, wherein step (5) comprises the step of generating computer displays containing one or more of the workflow process parameters identified in step (2).

15. The computer-assisted process of claim 1, wherein step (5) comprises the step of generating computer displays that are arranged into phases containing steps, wherein the steps comprise one or more questions.

16. The computer-assisted process of claim 1, further comprising the step of generating a new document containing information elicited during step (5).

17. The computer-assisted process of claim 1, further comprising the step of permitting the user to modify the workflow process parameters identified in step (2).

18. The computer-assisted process of claim 1, wherein step (1) comprises the step of detecting one of a phase; a step within a phase; or a question within a step; and further comprising the step of detecting text to be associated with the one phase; step; or question.

19. The computer-assisted process of claim 1, wherein the user-selected workflow process parameters comprise a placeholder indication.

20. The method of claim 1, wherein the data structure comprises an XML file, and wherein analyzing the user-selected text portion of the document to identify at least one corresponding user-selected workflow process parameter comprises tagging the XML file to include the corresponding user-selected workflow process parameters identified from the user-selected text portions.

21. The method of claim 1, controlled by a software tool usable by a user to specify the order in which the tagged information is provided within the workflow process.

22. A computer-assisted method of reverse engineering a contract text document into a data structure representing a workflow process, comprising the steps of:
(1) displaying the contract text document on a computer screen;
(2) receiving user input including speech from editing tools superimposed over the contract text document, the editing tools permitting the user to tag the document with associated workflow process parameters, being detected using voice recognition, based on user-selected portions of the document, said tagging correlating each user-selected portion to a user-selected order within the workflow process; and
(3) generating and storing the data structure as a template for driving the workflow process from the tagged document.

23. The computer-assisted method of claim 22, wherein the workflow process parameters comprise a user-specified question that will be asked during execution of the workflow process.

24. The computer-assisted method of claim 22, wherein the workflow process parameters comprise a user-specified order of a question that will be asked during execution of the workflow process.

25. The computer-assisted method of claim 22, wherein the workflow process parameters comprise a user-specified phase; a user-specified step; and a user-specified question.

26. The computer-assisted method of claim 25, wherein the user-specified phase indicates a phase during the workflow execution process during which the user-selected portions of the document will be solicited.

27. The computer-assisted method of claim 25, wherein the user-specified step indicates a step during the workflow execution process during which the user-selected portions of the document will be solicited.

28. The computer-assisted method of claim 25, wherein the user-specified question comprises a question to be solicited during the workflow execution process to elicit information corresponding to one of the user-selected portions of the document.

29. The method of claim 22, wherein the workflow process comprises a transaction negotiation process.

30. A computer-assisted process for converting a contract text document into a workflow process, comprising the steps of:
(1) displaying the contract text document on a computer screen;
(2) detecting user-selected text portions of the text document on the computer screen;
(3) detecting user-selected options for associating each user-selected text portion with a plurality of workflow process parameters including at least an indication of when information corresponding to the user-selected text portion will be solicited during the workflow process and an indication of how information corresponding to the user-selected text portion will be solicited during the workflow process, the plurality of workflow process parameters being detected using voice recognition;
(4) generating a template comprising a data structure that contains portions of the text document and the associations detected in step (3);
(5) based on the data structure generated in step (4), executing the workflow process by generating prompts to solicit information based on the template; and
(6) in response to detecting responses to the prompts, generating a new contract text document reflecting information entered in response to the prompts.

31. The computer-assisted process of claim 30, wherein step (4) comprises the step of generating an XML structured document that contains portions of the text document and the associates detected in step (3).

32. The computer-assisted process of claim 30, wherein step (5) comprises the step of generating computer displays that are partitioned into distinct phases comprised of steps, wherein each step comprises at least one question.

33. The computer-assisted process of claim 30, wherein step (5) comprises the step of generating a single computer screen for each of a plurality of distinct steps in the workflow process.

34. The process of claim 30, wherein the workflow process comprises a transaction negotiation process.

35. A system for deconstructing a contract text document into a workflow process, comprising:
a processor; and memory operatively connected to the processor and storing computer readable instructions that, when executed, cause the system to:

detect user-selected text portions of the displayed contract text document and for detecting, using voice recognition, at least one user-selected workflow process parameter associated with each user-selected text portion of the document;

tag the document to correlate each user-selected text portion with a user-selected order within the workflow process;

convert the tagged document into a template comprising a data structure representing an ordering of information to be elicited when the workflow process is executed; and use the template to drive the workflow process.

36. The system of claim 35, wherein using the template to drive the workflow process includes generating a plurality of computer displays that are arranged into phases, steps, and questions ordered into a sequence determined by a plurality of user-selected workflow process parameters.

37. The system of claim 35, wherein the workflow process comprises a transaction negotiation process.

38. A system for deconstructing a contract document into a workflow process, comprising:

a processor; and memory operatively connected to the processor and storing computer readable instructions that, when executed, cause:

a document editing tool to permit a user to select text portions of the contract document and to associate with each text portion one or more workflow process parameters that determine a sequence or content of one aspect of the workflow process, said associating comprising voice recognition of the one or more workflow process parameters and tagging the contract document to correlate each user-selected text portion with a user-selected order within the workflow process;

a document generator to convert the tagged text portions and associated workflow process parameters into a template comprising a data structure that represents an ordered sequencing of the workflow process; and a structured transaction engine to generate computer displays that prompt a user to enter information based on the one or more workflow process parameters stored in the template.

39. The system of claim 38, wherein the workflow process comprises a transaction negotiation process.

\* \* \* \* \*